United States Patent
Baumgarten et al.

(10) Patent No.: US 10,285,329 B2
(45) Date of Patent: May 14, 2019

(54) METHOD FOR DETERMINING CALIBRATION DATA FOR GRAIN-LOSS SENSOR

(71) Applicant: CLAAS SELBSTFAHRENDE ERNTEMASCHINEN GMBH, Harsewinkel (DE)

(72) Inventors: Joachim Baumgarten, Beelen (DE); Christoph Heitmann, Warendorf (DE); Sebastian Neu, Bad Laer (DE); Benedikt Feldotto, Rietberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 246 days.

(21) Appl. No.: 15/017,854

(22) Filed: Feb. 8, 2016

(65) Prior Publication Data

US 2016/0235003 A1    Aug. 18, 2016

(30) Foreign Application Priority Data

Feb. 12, 2015   (DE) .................. 10 2015 102 056

(51) Int. Cl.
    *A01D 41/127*        (2006.01)
(52) U.S. Cl.
    CPC ................. *A01D 41/1273* (2013.01)
(58) Field of Classification Search
    CPC ........... A01D 41/1276; A01D 41/1273; A01D 41/1271; A01D 41/1277; A01D 41/1275
    USPC ....................................... 702/104
    See application file for complete search history.

(56) References Cited

U.S. PATENT DOCUMENTS

| | | | | |
|---|---|---|---|---|
| 2003/0199291 A1* | 10/2003 | Bernhardt | .......... | A01D 41/1273 460/4 |
| 2004/0186597 A1* | 9/2004 | Wippersteg | .......... | A01D 41/127 700/31 |
| 2007/0091476 A1* | 4/2007 | Takashima | ............. | G02B 7/102 359/822 |
| 2007/0149265 A1* | 6/2007 | Behnke | .............. | A01D 41/1276 460/1 |
| 2007/0233374 A1* | 10/2007 | Diekhans | ............... | G01C 21/20 701/533 |
| 2014/0171161 A1* | 6/2014 | Bischoff | .............. | A01D 41/127 460/1 |
| 2014/0208851 A1* | 7/2014 | Bischoff | .............. | A01D 41/127 73/593 |
| 2014/0215984 A1* | 8/2014 | Bischoff | ................ | A01D 75/00 56/10.2 R |

(Continued)

FOREIGN PATENT DOCUMENTS

DE        19820819       1/2000

*Primary Examiner* — Duy T Nguyen

(74) *Attorney, Agent, or Firm* — Collard & Roe, P.C.

(57) ABSTRACT

A method for determining calibration data for a grain-loss sensor on a combine harvester includes measuring grain-loss quantities, which were left behind by the combine harvester during a harvesting operation, and measuring sensor grain-loss values by the grain-loss sensor during the harvesting operation. Reference marks are assigned to the measured grain-loss quantities and the measured sensor grain-loss values and the calibration data for the grain-loss sensor are determined on the basis of a reconciliation of the measured grain-loss quantities with the measured sensor grain-loss values according to the reference marks.

15 Claims, 3 Drawing Sheets

(56) References Cited

U.S. PATENT DOCUMENTS

2015/0348419 A1* 12/2015 Matthews .............. A01B 79/02
  701/117
2015/0349917 A1* 12/2015 Skaaksrud ......... G06Q 10/0833
  370/328

* cited by examiner

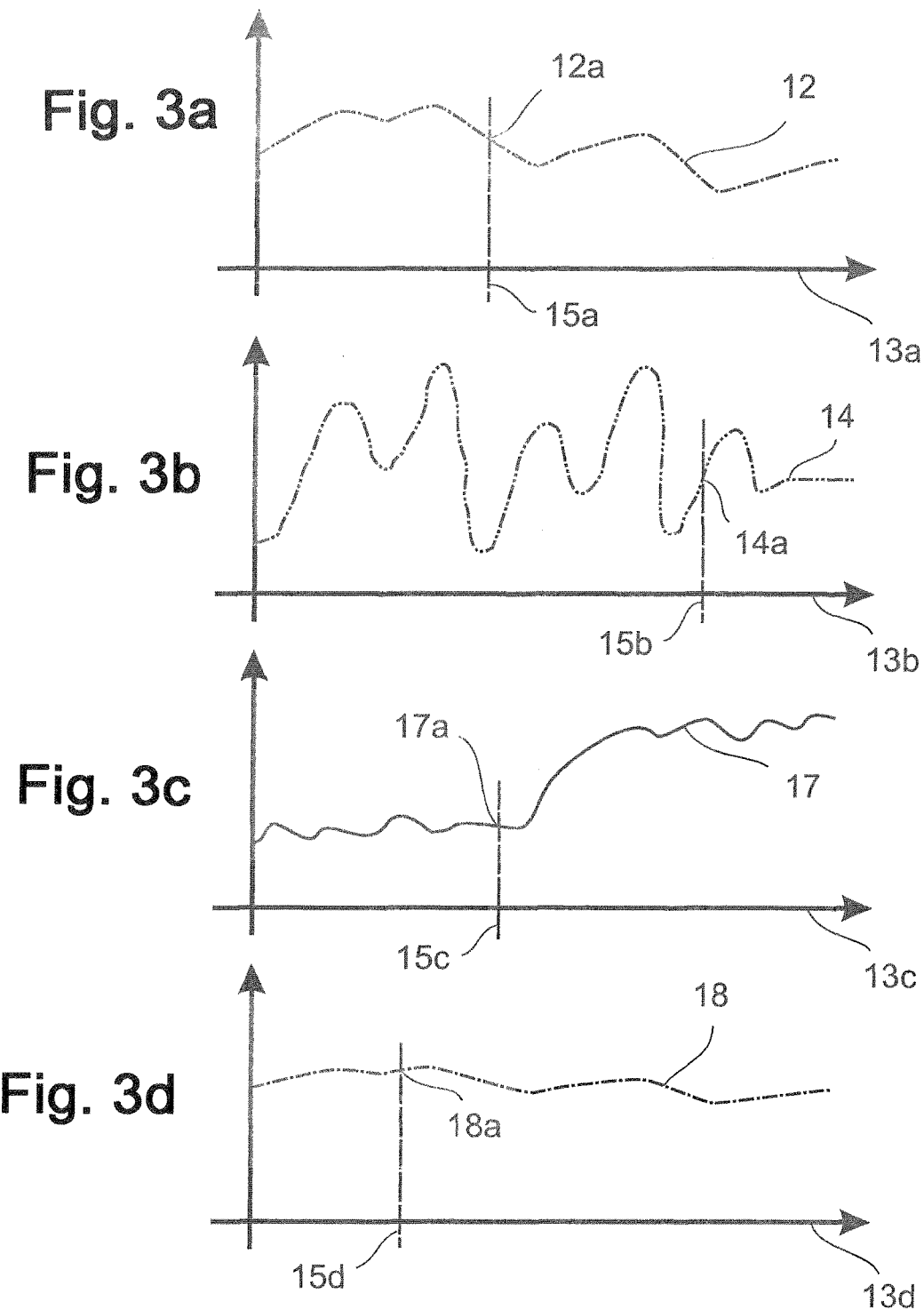

METHOD FOR DETERMINING CALIBRATION DATA FOR GRAIN-LOSS SENSOR

CROSS-REFERENCE TO A RELATED APPLICATION

The invention described and claimed hereinbelow is also described in German Priority Document DE 10 2015 102056.4, filed on Feb. 12, 2015. The German Priority Document, the subject matter of which is incorporated herein by reference, provides the basis for a claim of priority of invention under 35 U.S.C. 119(a)-(d).

BACKGROUND OF THE INVENTION

The present invention relates to a method for determining calibration data for a grain-loss sensor on a combine harvester.

Grain losses during the harvesting operation of a combine harvester refer to the grains of the picked-up crop stream which were either not initially effectively threshed out of the straw or, despite having been threshed out by the threshing mechanism or by the cleaning assembly of the combine harvester, were not further conveyed into the grain tank, which is actually desired. Instead, such grain loss grains are left on the field by the combine harvester, as is the threshed-out straw. These grain losses, which should be kept low if possible, depend on the ground speed and the operating settings of the threshing mechanism, in particular, of the combine harvester and on ambient conditions such as the condition of the crop and of the field, e.g., in terms of moisture and crop density. Invariable and optimal settings for the threshing mechanism therefore do not exist for all basic conditions; instead, these must be adjusted according to the aforementioned ambient conditions and the ground speed in order to reduce or minimize the grain losses.

At the same time, economic requirements regularly exist with respect to a maximum grain loss, which must not be exceeded during the harvesting of a field and which can be indicated as a proportion of all grains or by another metric. It is often additionally economically useful or required, while observing the maximum grain loss, to simultaneously minimize the duration of harvesting, which would be possible, e.g., by increasing the ground speed, or to reduce the energy consumption of the threshing mechanism, wherein these two requirements have certain conflicting goals with the grain losses. The driver of the combine harvester therefore regularly strives to operate the combine harvester slightly below the specified grain-loss limit.

The determination of the present grain losses, which is important for such an adjustment, during the harvesting operation has proven to be difficult so far. On the one hand, it is known from the prior art that the driver of the combine harvester or a helper on the field between the straw and chaff left behind by the combine harvester qualitatively determines the density or quantity of the loss grains, which also are left behind. Such conventional method, however, is both complicated and inaccurate, and adjusting the settings of the combine harvester when a new measurement is carried out is time-consuming, in particular. This principle is only slightly improved by the use of control pans for receiving loss grains, which are either set down by the combine harvester at certain times or are manually placed by a helper for capturing the grain loss.

Grain-loss sensors disposed on the combine harvester also are known from the prior art, which are disposed, e.g., in the region of a straw walker rack of the threshing mechanism and are intended to determine the grain losses on the basis of the detected impact behavior of falling grains. The concept of grain losses is intended to mean, here and in the following, either an absolute value of grain losses, e.g., expressed in grain volume or grain mass per unit of field area, or a relative amount based on another variable.

A problem associated with these grain-loss sensors is that it is difficult to establish a relation between the values measured by the grain-loss sensor and the actual grain losses. The reason is that the relation between the values measured by the grain-loss sensor, which are referred to here and in the following as sensor grain-loss values and which represent the measurement signal per se, which is generated by the grain-loss sensor, and the actual grain losses likewise depends very heavily on the overall volume of the grain stream and on the aforementioned ambient conditions. Hence, it is difficult to calibrate the grain-loss sensors in order to determine the actual grain losses.

Patent document DE 198 20 819 C2, describes the possibility of calibrating the grain-loss sensors by evaluating the aforementioned control pans, although the highly inaccurate assignment of the measured values of the grain-loss sensors to the evaluation of the control pans limits the precision of the calibration. In addition, the method is highly time-consuming.

SUMMARY OF THE INVENTION

The present invention overcomes the shortcomings of known arts, such as those mentioned above.

To that end, the present invention provides a method for determining improved calibration data for a grain-loss sensor on a combine harvester.

An important feature of the invention is the finding that the calibration of such a grain-loss sensor can be carried out particularly accurately when the sensor grain-loss values measured by the grain-loss sensor can be reconciled with the actually determined grain losses. In other words, a measurement of actual grain-loss quantities can be carried out, on the field, for example, within the straw left behind and within the chaff left behind or in a control pan, and the corresponding measured values, i.e., sensor grain-loss values, of the grain-loss sensor are assigned to this measurement. In this manner, an actual grain loss can be assigned to a sensor grain-loss value, whereby the desired accurate calibration data for the grain-loss sensor can be determined. The assignment of a measured grain-loss quantity to a sensor grain-loss value then takes place with the aid of reference marks, which are assigned to the grain-loss quantity and to the sensor grain-loss value, which reference marks indicate a position or a time, for example, and thereby a mutual assignment is made possible.

In an embodiment, the invention provides a method for determining calibration data for a grain-loss sensor on a combine harvester. The method includes measuring grain-loss quantities, which were left behind by the combine harvester during a harvesting operation, measuring sensor grain-loss values during the harvesting operation, assigning reference marks to the measured grain-loss quantities and the measured sensor grain-loss values and determining the calibration data for the grain-loss sensor based on a reconciliation of the measured grain-loss quantities with the measured sensor grain-loss values according to the reference marks. The calibration data are used to convert the determined sensor grain-loss values into a percental, loss proportion of an overall grain yield.

The method may include measuring grain-yield quantities by the combine harvester during the harvesting operation and assigning reference marks to each of the measured grain-yield quantities; wherein the conversion into the loss proportion of the overall grain yield is based on the measured grain-yield quantities. The method may include determining the sensor grain-loss values, using the grain-loss sensor, by detecting a moving grain-loss stream on the combine harvester; wherein the grain-loss quantities are measured as fixed, static variables. The reference marks preferably include a particular piece of position information regarding a position of the combine harvester during the particular measurement.

The position information of the reference marks, which are assigned to the sensor grain-loss values, are generated during the harvesting operation by an electronic positioning system of the combine harvester and correspond to a position of the combine harvester during a measurement of the sensor grain-loss values. The calibration data are designed for a position-dependent calibration of the grain-loss sensor, and wherein the calibration data for a particular position are determined from a reconciliation of a sensor grain-loss value and a grain-loss quantity for a reference mark corresponding to the particular position. The reference marks preferably include a particular piece of time information related to the measurement time, and wherein reconciliation of the grain-loss quantities with the sensor grain-loss values according to the reference marks takes into account a process-time offset between the measurement of the sensor grain-loss values and the leaving-behind of the grain-loss quantities.

The method grain-loss quantities are provided as a number of grains per area, as a volume of grains per area, or as grain mass per area. The sensor grain-loss values and the reference marks assigned thereto are wirelessly transmitted to a central computer during the harvesting operation, and wherein reconciliation of the grain-loss quantities with the sensor grain-loss values according to the reference marks, takes place in the central computer. The reference marks assigned thereto are wirelessly transmitted to a central computer during measurement of the sensor grain-loss values.

Preferably, the determination of the calibration data for the grain-loss sensor takes place in the central computer and the measurement of the grain-loss quantities is initiated by the combine harvester and wherein the combine harvester assigns a particular reference mark to the measured grain-loss quantities. The measurement of the grain-loss quantities is initiated by a measuring system, which is separate from the combine harvester and wherein the measuring system assigns the particular reference mark to the measured grain-loss quantities. For that matter, the grain-loss quantities are measured in a particular control pan disposed on the combine harvester until the particular control pan is deposited, and wherein the depositing of the control pan is initiated by the combine harvester. The control pan, for receiving the grain-loss quantities, is placed manually independently of the combine harvester; the determined calibration data are stored and are transmitted wirelessly to a further combine harvester, from the central computer.

BRIEF DESCRIPTION OF THE DRAWINGS

Further features and advantages of the invention will become apparent from the description of exemplary embodiments that follows, with reference to the attached figures, wherein:

FIG. 3a depicts a measurement curve recorded during the implementation of the method according to the invention;

FIG. 3b depicts a measurement curve recorded during the implementation of the method according to the invention;

FIG. 3c depicts a measurement curve recorded during the implementation of the method according to the invention; and FIG. 3d depicts a measurement curve recorded during the implementation of the method according to the invention.

DETAILED DESCRIPTION OF THE INVENTION

Figure 1:
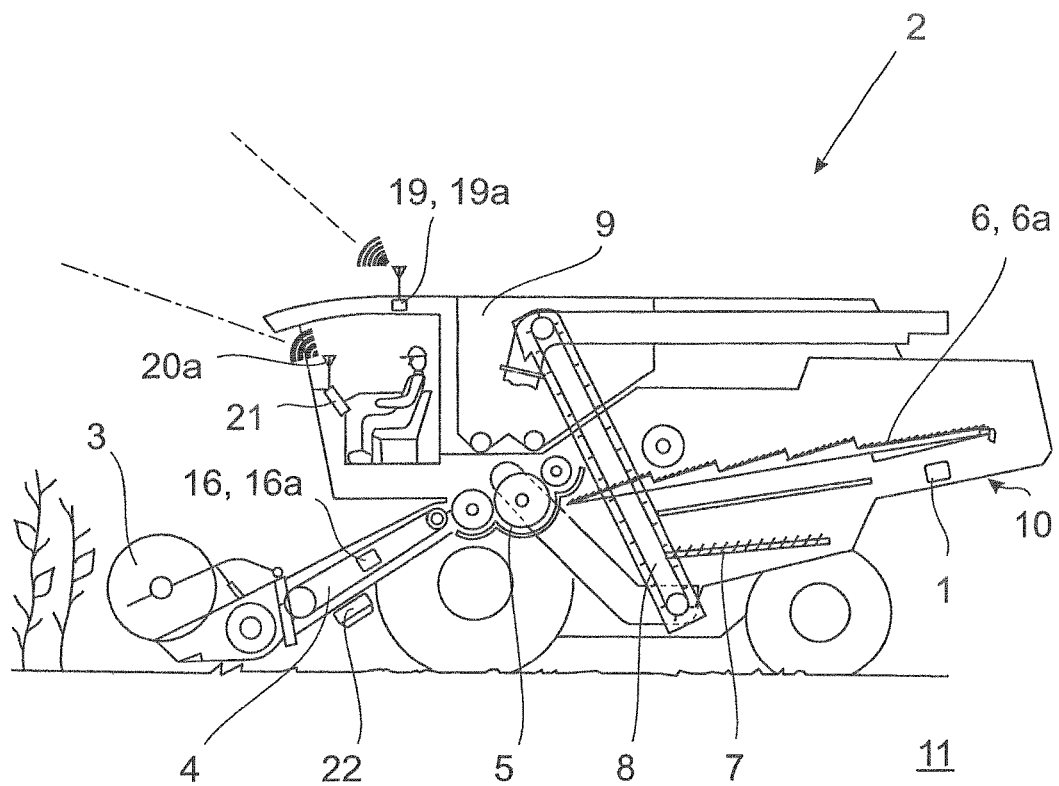
FIG. 1 presents a schematic side view of a combine harvester for the method according to the invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A method according to the invention provides for determining calibration data for a grain-loss sensor 1 on a combine harvester 2. Such a combine harvester 2 is shown in a schematic side view in FIG. 1. Combine harvester 2 comprises a header 3, a slope conveyor 4, a threshing assembly 5, a separating assembly 6, a cleaning assembly 7, a transport assembly 8 and a grain tank 9, wherein the picked-up crop stream or the grain stream is conveyed through these sections of the combine harvester 2 essentially in the aforementioned sequence for processing.

More specifically, the grain is or should be separated from the crop in the threshing assembly 5 and the separating assembly 6, wherein the separated grain is cleaned, in particular, of chaff and other non-grain components, in the cleaning assembly 7 and the cleaned grain is subsequently fed to the grain tank 9 by the transport assembly 8. The straw and the chaff are then deposited at the rear 10 of the combine harvester 2 and emerge from the combine harvester 2 at the corresponding end of the separating assembly 6, which can comprise lengthwise oriented straw walker racks 6a, and land on the field 11. A position of the combine harvester 2 on the field is shown, by way of example, in a schematic top view in FIG. 2.

The grain-loss sensor 1, according to the illustration in FIG. 1, is disposed at a rear end of the separating assembly 6 and, specifically, underneath the straw walker racks 6a, comprises a sensor plate and a vibration sensor, which detects the impact of grains that drop from the straw walker racks 6a, for example, and impact the sensor plate. The grain-loss sensor 1 also can comprise a multiple-component sensor assembly according to the measurement principle described above or according to another measurement principle. These multiple parts of the sensor assembly are then disposed so as to be distributed along the above-described conveyance path, in particular, along the threshing assembly 5 and the separating assembly 6. The multiple parts of such a multiple-component grain-loss sensor 1 also can be disposed, equally spaced, transversely to this conveyance path and, therefore, transversely to a longitudinal direction of the combine harvester 2.

In the method according to the invention, grain-loss quantities 12 left behind by the combine harvester 2 during a harvesting operation are measured. FIG. 3*a-d* show a corresponding illustration. This corresponds to the above-described process, wherein this leaving-behind can take place continuously or quasi continuously or in intervals. A curve of the measured grain-loss quantities 12 along a time axis 13*a* is shown in FIG. 3*a*, by way of example. Since the corresponding grains have already left the combine harvester 2 at the time of the measurement of the grain-loss quantities 12, this measurement, which relates to the number or any other quantity of the loss grains, can be carried out highly accurately by providing a longer measuring time.

In the method according to the invention, sensor grain-loss values 14 are also measured by the grain-loss sensor 1 during the harvesting operation. Therefore, this measurement is a measurement during the operation and also is a measurement of a variable changing over time. The curve of the sensor grain-loss values 14 along a time axis 13*b* is shown in FIG. 3*b*, by way of example. It should be noted that, according to the above-described mode of operation, the grain-loss sensor 1 cannot readily and directly detect the quantitatively accurate quantity of grain losses. This is due not only to the fact that all lost grains still do not even reach the detection region of the grain-loss sensor 1, but also to the fact that, as described above, the relationship between the measured sensor grain-loss values 14 and the actual quantity of lost grains can differ greatly. It should therefore be noted that the sensor grain-loss values 14 specifically refer to the signals generated by the grain-loss sensor 1 as measured values.

The calibration data within the meaning of the method according to the invention are therefore used for relating these sensor grain-loss values 14 to the actual losses of grains, which correspond to the sensor grain-loss values 14. This is precisely how the term "calibration" is intended to be understood here. It should be noted that there is absolutely no need for a continuous measurement of the grain-loss quantities 12 or the sensor grain-loss values 14 according to the curves continuously shown in FIG. 3*a, b*. Instead, individual measurements or all measurements can also take place at discrete points in time.

The method according to the invention is characterized in that reference marks 15*a, b* are assigned to the measured grain-loss quantities 12 and the measured sensor grain-loss values 14 and that the calibration data for the grain-loss sensor 1 are determined on the basis of a reconciliation of the measured grain-loss quantities 12 with the measured sensor grain-loss values 14 according to the reference marks 15*a, b*. FIGS. 3*a, b* show here, by way of example, only one reference mark 15*a, b*, respectively, corresponding to a single measured value for the grain-loss quantities 12, i.e., the grain-loss quantity 12*a*, and for the sensor grain-loss values 14, i.e., the sensor grain-loss value 14*a*. The assignment of the reference marks 15*a, b* in this case can relate to an individual, i.e., instantaneous measured value of the grain-loss quantities 12 or of the sensor grain-loss values 14 as shown here or, with respect to the sensor grain-loss values 14 in particular, to an entire time interval of measured values.

Furthermore, the sensor grain-loss values 14, in particular, also can have undergone a certain averaging or any other type of filtering and, therefore, are not necessarily "raw". The term "reference mark" is intended to be broadly interpreted here and in the following. In particular, this can mean any type of information, which identifies at least one measuring process, having the particular measured value, and therefore allows for a comparison or reconciliation with and, primarily, an assignment to other measuring processes on the basis of their reference marks. Various measuring processes can therefore be determined as matches. In this sense, measuring processes which do not match also can be determined and, therefore, differentiated. If the reference mark includes a piece of position information or a piece of time information, as is described in greater detail below, this assignment can then be based on a temporal or spatial proximity or identity.

In the present example, the reference mark 15*a* therefore corresponds to the grain-loss quantity 12*a* and the reference mark 15*b* corresponds to the sensor grain-loss value 14*a*. Due to a reconciliation between the particular grain-loss quantities 12 and the sensor grain-loss values 14 by matching reference marks 15*a, b*, calibration data can therefore be determined, with which the grain-loss sensor 1 is calibrated and set in such a way that a quantitative statement regarding the actual grain loss, e.g., corresponding to a grain-loss quantity 12, is assigned to a subsequently measured sensor grain-loss value 14, although this time without requiring an actual measurement of the grain-loss quantity. The calibration data is used, in particular, for selecting a corresponding characteristic curve for the grain-loss sensor 1, e.g., from a series of predefined characteristic curves, for adjusting such a predefined characteristic curve, and searching for the adjusted characteristic curve, or even for generating and, in particular, newly generating such a characteristic curve.

The relationship between the sensor grain-loss values 14 and the grain-loss quantities 12 can also depend on further, in particular varying variables, such as, for example, a moisture of the crop or straw picked up from the field 11 by the combine harvester 2. Preferably, ambient values 17 are therefore measured during the harvesting operation by an ambient sensor 16, which is a moisture sensor 16*a* illustrated in FIG. 1 in this case, of the combine harvester 2, wherein the ambient values in this exemplary embodiment are, for example, straw moisture values in the picked-up crop stream, and reference marks 15*c* are assigned to each of the ambient values 17. Analogously to the grain-loss quantities 12 and the sensor grain-loss values 14, a curve of measured ambient values 17, straw moisture values, by way of example, in this case, is shown in FIG. 3*c* over the time axis 13*c* having a single reference mark 15*c*, provided by way of example, and the corresponding ambient value 17*a*. It is then advantageous when the calibration data are also determined on the basis of a reconciliation of the measured ambient values 17 according to the reference marks 15*a-c* with the grain-loss quantities 12 and/or with the sensor grain-loss values 14. It should be noted that the time axes 13*a-d* can be offset or have a different scale with respect to one another.

As described above, an economically particularly significant characteristic quantity is the proportion of grain losses with respect to the overall yield of grain. It is therefore preferable that the calibration data are designed to convert the sensor grain-loss values 14 determined by the grain-loss sensor 1 into a percental, in particular, loss proportion of an overall grain yield. It can then be easily determined whether a requirement in this regard has been met.

According to an embodiment, this can be achieved in that the combine harvester 1 measures grain yield quantities 18 in the harvesting operation. The grain yield quantities 18 can be measured directly, e.g., via a camera on the transport assembly 8, which transport assembly 8 according to FIG. 1 can be formed by a grain elevator, for example. Such a camera can also be disposed on the grain tank 9. A curve of measured grain-yield quantities 18 is shown in FIG. 3*d*, by way of example, over the time axis 13*d*. These grain-yield quantities 18 are, for example, grain arriving in the grain tank 9, preferably minus the non-grain components thereof, provided these non-grain components were determined, for example, by a suitable sensor. In a measurement carried out by a camera as described above, such non-grain components can also be subtracted on the basis of image processing.

Furthermore, it is preferable that reference marks 15*d* are assigned to each of the measured grain-yield quantities 18 and that the conversion into the loss proportion of the overall grain yield is based on the measured grain-yield quantities 18. Such a single reference mark 15*d* with the corresponding grain-yield quantity 18*a* is shown in FIG. 3*d*, by way of example. Preferably, the measured grain-yield quantities 18 according to the respectively assigned reference marks 15*d* are reconciled with the measured values mentioned further above. Alternatively, or additionally to this described relation to the overall grain yield, the measured sensor grain-loss values 14 can be related to an overall crop throughput in an analogous manner and can be converted to a corresponding loss proportion.

As described above, it is essential to the invention that two different measurements according to their respective reference marks 15*a-d* are reconciled and related to one another, whereby a corresponding ratio of these two variables is determined for a calibration. The measurement of the grain-loss quantities 12 and the measurement of the sensor grain-loss values 14 are also measurements carried out under different conditions, however. Preferably, the grain-loss sensor 1 determines the sensor grain-loss values 14 by detecting a moving grain-loss stream at the combine harvester 2. Therefore, a momentary, relatively slowly changing or instantaneous value is detected, and so the measuring process cannot be repeated or extended over a longer time period in order to increase the precision. This also applies when each of the sensor grain-loss values 14 is based on a measurement across an entire time interval, as described above, since every single value in this time interval as well is instantaneous. Conversely, the grain-loss quantities 12 are preferably measured as fixed and, in particular, static variables. Since the grain-loss quantities 12 at the time of the measurement are already stable as a loss and are therefore static, the measurement thereof may be more time-consuming and may therefore be more accurate.

The type of information contained in the reference marks 15*a-d* for the reconciliation can differ. In a variant, the reference marks 15*a-d* include a particular piece of position information regarding a position of the combine harvester 2 during the particular measurement. This piece of position information can be, for example, the position of the combine harvester 2 during the particular measurement or, specifically with respect to the grain-loss quantities 12, the position at which the grain-loss quantities 12 were left. The reconciliation according to the reference marks 15*a-d* can then represent an assignment of measured values, each of which has the same position.

Figure 2:
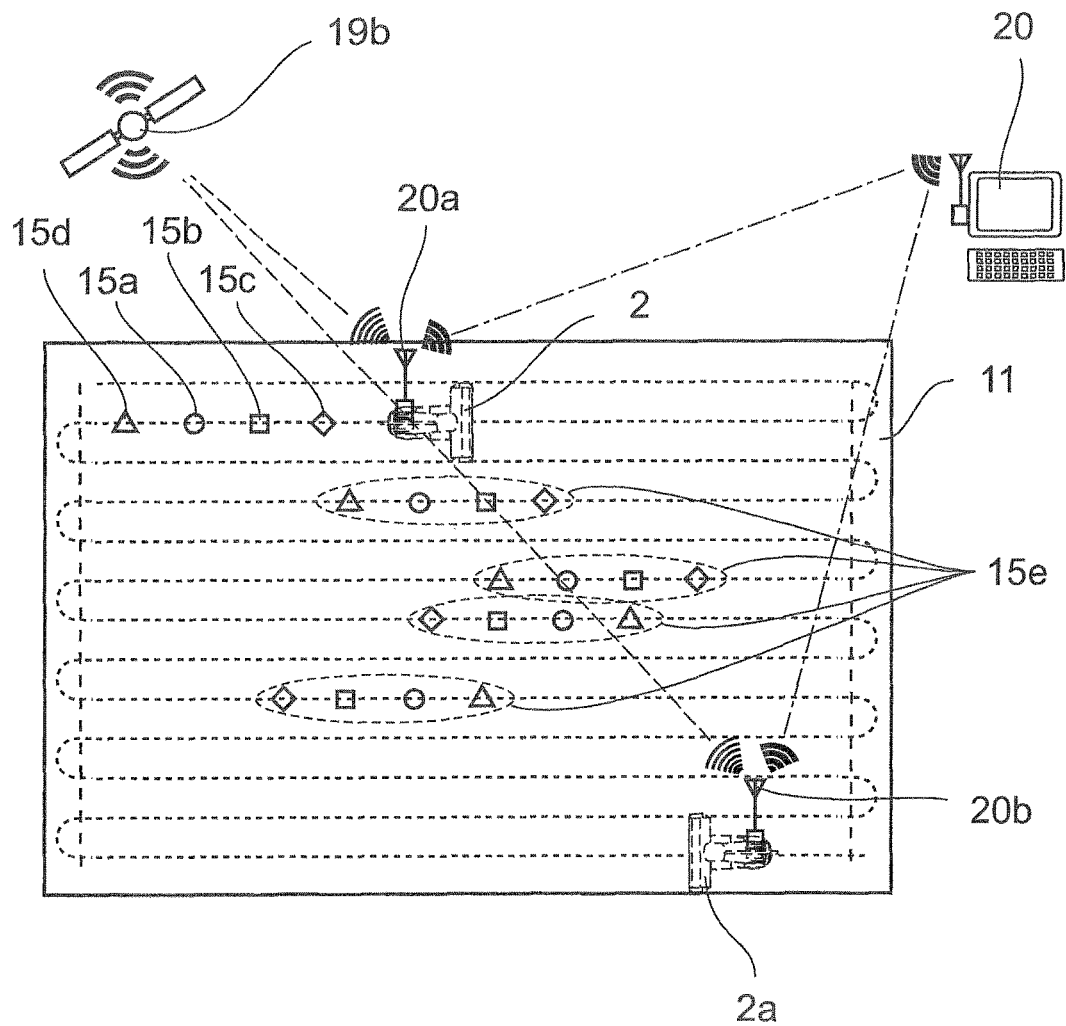
FIG. 2 presents a schematic view of a field during the tillage by a combine harvester in the harvesting operation and during the implementation of the method according to the invention.

On the other hand, if it is known that a position offset takes place in the time between a measurement of the sensor grain-loss values 14 and the leaving-behind of the grain-loss quantities 12 due to a driving movement of the combine harvester 2, which offset is evident from the arrangement of the reference marks 15*a, b* in FIG. 2, the reconciliation can take this offset into account, which offset may be dependent on speed. FIG. 2 also shows a corresponding position offset of the grain-yield quantities 18 measured in the harvesting operation, according to the reference mark 15*d*, and the optionally measured ambient values 17, according to the reference mark 15*c*. Different aforementioned types of offsets, preferably all the aforementioned types of offsets are therefore preferably taken into account in the reconciliation.

As is evident from FIG. 2, the following are carried out at regular time intervals, based on the same "point" in the crop stream in each case, first the measurement of the ambient values 17, preferably in the slope conveyor 4 itself, then the measurement of the sensor grain-loss values 14, then the leaving-behind of the grain-loss quantities 12, and finally the measurement of the grain-yield quantities 18, because the processing time up to the grain tank 9 typically lasts longer than the path up to the leaving-behind of the grain-loss quantities. In the present example, the measurement of the ambient values 17 takes place essentially simultaneously with the measurement of the sensor grain-loss values 14. In the specific case, the offset can also represent a different sequence of reference marks 15*a-d* or there may not be an offset at all. In FIG. 2, even more reference mark groups 15*e* are shown, by way of example, which correspond to previously carried out measurements, and the particular reference marks of which each have the same offset with respect to one another.

The position information of the reference marks 15*b*, which are assigned to the sensor grain-loss values 14, are generated during the harvesting operation by an electronic positioning system 19, in particular a GPS module 19*a* of the combine harvester 2. The GPS module 19*a* is designed to receive signals from a satellite system 19*b*. In this case, the position information of these reference marks 15*b* preferably corresponds to the particular position of the combine harvester 2 during the measurement of the sensor grain-loss values 14. In particular, the aforementioned piece of position information can include or correspond to a piece of global coordinate information, e.g., of a geographical coordinate system. This piece of global coordinate information can be a piece of coordinate information provided by a GPS system.

In this manner, a calibration of the grain-loss sensor 1, which may be dependent upon location or position, also is taken into account, specifically, for example, when the calibration is dependent upon properties of the field 11, which properties cannot be readily detected by the sensors on the combine harvester 2, however. It is therefore preferred that the calibration data are designed for a position-dependent calibration of the grain-loss sensor 1. Calibration data for a particular position is then determined from the reconciliation of a sensor grain-loss value 14 and a grain-loss quantity 12 for the particular reference mark 15*a, b* corresponding to the particular position. If such an assigned measured value is not present for each position, because, for example, the grain-loss quantities 12 are measured only at discrete positions, it is possible, for example, to perform an interpolation or any other type of approximation of the grain-loss quantities 12 for the remaining positions in order to determine the calibration data for the position-dependent calibration.

As an alternative or in addition to such a piece of position information of the reference marks 15*a-d*, these reference marks 15*a-d* also can take time information into account. Therefore, it is preferable that the reference marks 15*a-d* include a particular piece of time information related to the measurement time, i.e., the point in time at which the particular measurement was carried out. This piece of time information can be a time stamp, in particular. In this case as well, the reconciliation of the grain-loss quantities 12 with the sensor grain-loss values 14 according to the reference marks 15a, b can take into account a process-time offset between the measurement of the sensor grain-loss values 14 by the grain-loss sensor 1 and the leaving-behind of the grain-loss quantities 12.

The measured grain-loss quantities 12 can be present in different units for the aforementioned reconciliation. According to a variant, the grain-loss quantities 12 are provided as a number of grains per area, as a volume of grains per area, and/or as grain mass per area.

The method according to the invention can run entirely in the combine harvester 2, in principle. For example, the grain-loss quantities 12 could also be measured by a field camera (not shown), disposed on the combine harvester 2 but directed toward the field 11. In particular, according to a variant, when the left-behind grain-loss quantities 12 are measured by a device separate from the combine harvester 2, the grain-loss quantities 12 and the reference marks 15a assigned thereto are preferably wirelessly transmitted to the combine harvester 2 or to the control device 21.

According to a further variant, it is preferable that essential steps of the method according to the invention are carried out centrally and, therefore, outside the combine harvester 2. For example, it is preferably provided that the sensor grain-loss values 14 and the reference marks 15b assigned thereto are wirelessly transmitted to a central computer 20 during the harvesting operation, preferably as soon as the sensor grain-loss values 14 are detected. In addition to the sensor grain-loss values 14 and the reference marks 15b assigned thereto, it also is possible to wirelessly transmit the grain-yield quantities 18, likewise with the reference marks 15d assigned thereto, as well as the ambient values 17 along with the reference marks 15c assigned thereto, and, optionally, further measured values, to the central computer 20. These single measured values with the assigned reference marks 15b-d, which preferably include a piece of time information and/or a piece of position information, as described above, can then be combined in the manner of a vector, which can be referred to here as a signal vector.

This transmission is carried out by a mobile radio device 20a on the combine harvester 2 and can be used, in particular, to ensure that the reconciliation of the grain-loss quantities 12 with the sensor grain-loss values 14 according to the reference marks 15a, b is carried out in the central computer 20. This is suitable, in particular, when the measurement of the grain-loss quantities 12 is carried out independently of the combine harvester 2, as is described below. Furthermore, the determination of the calibration data for the grain-loss sensor 1 also can take place in the central computer 20. As an alternative, the determination of the calibration data for the grain-loss sensor 1 can also take place in the combine harvester 2 or in the control device 21.

With respect to the measurement of the grain-loss quantities 12, according to a first variant, the measurement of the grain-loss quantities 12 is initiated by the combine harvester 2, and the combine harvester 2 assigns the particular reference mark 15a to the measured grain-loss quantities 12. In particular, this initiation and the assignment of the particular reference mark 15a is carried out by a control device 21 of the combine harvester 2. In this manner, a defined time- or position-based offset with respect to the measurement of the sensor grain-loss values 14 is easily achieved. In this case, despite this initiation by the combine harvester 2 or the control device 21 thereof, the actual measurement is carried out by an assembly separate from the combine harvester 2.

According to a second variant in this regard, the measurement of the grain-loss quantities 12 is initiated by a measuring system, which is not shown here, is separate from the combine harvester 2, and can be, for example, a separate vehicle having a suitable sensor, and the measuring system assigns the particular reference mark 15a to the measured grain-loss quantities 12. This separation makes it possible to carry out the measurement of the grain-loss quantities 12, in particular, temporally independently of the harvesting operation of the combine harvester 2. The measured grain-loss quantities 12 can then likewise be wirelessly transmitted together with the assigned reference marks 15a to the central computer 20 and, to this end, combined into a so-called data vector. Alternatively, and in particular, when the reconciliation takes place in the combine harvester 2, this data vector and the data it comprises also can be wirelessly transmitted to the combine harvester 2.

In an embodiment, control pans 22 are used for measuring the grain-loss quantities 12. Such control pans 22, which are known, in principle, from the prior art and are not shown in detail here, are used for measuring the actual loss grains. To this end, the control pans comprise, for example, receiving pockets for the loss grains, which receiving pockets are successively filled by the loss grains. The grain-loss quantity 12 can then be determined, via a visual inspection, on the basis of the fill level of these receiving pockets. Further design variants of such control pans also are conceivable. Therefore, it is preferable that the grain-loss quantities 12 accommodated in a particular control pan 22 are measured. In order to receive the loss grains, it is provided that the control pan 22 is situated under or behind the combine harvester 2 in the region of the rear end of the separating device 6 on the ground of the field 11. There are various possibilities for placing the control pan 22 in such a manner.

In order to eliminate the need for assistance by a further person, who is situated next to the combine harvester 2, for this placement of the control pan 22, it can be provided, in particular, that the particular control pan 22 is disposed on the combine harvester 2, in this case in the region of the header 3, according to FIG. 1, until release takes place, or until the control pan 22 ejected, and the release of the control pan 22 is initiated by the combine harvester 2 or by the control device 21 of the combine harvester 2. As a result, the control pan 22 drops onto the ground of the field 11. The combine harvester 2 then travels, during the harvesting operation, over the deposited control pan 22 such that this control pan then reaches the aforementioned region of the rear end of the separating assembly 6.

Alternatively, to the placement of the control pan 22 on the combine harvester 2, the control pan 22 also can be placed independently of the combine harvester 2 in order to receive the grain-loss quantities 12, manually, for example, by the aforementioned person situated next to the combine harvester 2.

The calibration data determined according to the invention can be used, on the one hand, for calibrating or setting the same grain-loss sensor 1 that has determined the sensor grain-loss values 14 on which the calibration data are based. Preferably, the calibration data also can be used for calibrating a grain-loss sensor on a further combine harvester 2a. In that case, it is preferable that the determined calibration data are stored, for example, in the central computer 20, and are made available to the further combine harvester 2a, which is illustrated in FIG. 2 by way of example. To this end, the invention provides that the determined calibration data are transmitted from the central computer 20 to the further combine harvester 2a, in particular wirelessly, for example by a mobile radio device 20b of the further combine harvester 2a. If the determination of the calibration data, as described above, for the grain-loss sensor 1 takes place in the central computer 20, then this determination also is based on a reconciliation of the measured grain-loss quantities 12 with the measured sensor grain-loss values 14 by multiple combine harvesters. In this manner, the data basis for the determination of the calibration data can be enlarged and, therefore, an even more accurate calibration can be achieved.

LIST OF REFERENCE NUMBERS 1 grain-loss sensor
2 combine harvester
3 header
4 slope conveyor
5 threshing assembly
6 separating assembly
6a straw walker racks
7 cleaning assembly
8 transport assembly
9 grain tank
10 rear
11 field
12, 12a grain-loss quantities
13a-d time axis
14, 14a sensor grain-loss values
15a-e reference marks
16, 16a ambient sensor
17, 17a ambient values
18, 18a grain-yield quantities
19 electronic positioning system
19a GPS module
19b satellite system
20 central computer
20a, b mobile radio device
21 control device
22 control pans As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for determining calibration data for a grain-loss sensor on a combine harvester, comprising the steps of:
   harvesting grain with the combine harvester in a harvesting operation;
   measuring with a control pan that is disposed under or behind the combine harvester grain-loss quantities which were left behind by the combine harvester during the harvesting operation;
   measuring sensor grain-loss values with the grain-loss sensor during the harvesting operation, the grain-loss sensor comprising a grain loss plate and vibration sensor connected to the combine harvester and that detects a moving grain loss stream over a time interval;
   wirelessly sending data related to the measured grain loss quantities and sensor grain loss values to a remote central computer;
   assigning reference marks to the measured grain-loss quantities and the measured sensor grain-loss values; and
   determining with the central computer the calibration data for the grain-loss sensor based on a reconciliation of the measured grain-loss quantities with the measured sensor grain-loss values according to the reference marks;
   sending the calibration data from the computer to the combine harvester; and
   adjusting operating settings of the combine harvester based on the calibration data to maximize ground speed of the combine harvester or reduce energy consumption of a threshing mechanism of the combine harvester while not exceeding a preset maximum grain loss.

2. The method according to claim 1, further comprising using the calibration data to convert the determined sensor grain-loss values into a percental, loss proportion of an overall grain yield.

3. The method according to claim 2, further comprising measuring grain-yield quantities by the combine harvester during the harvesting operation and assigning reference marks to each of the measured grain-yield quantities; wherein the conversion into the loss proportion of the overall grain yield is based on the measured grain-yield quantities.

4. The method according to claim 1, wherein the grain-loss quantities are measured as fixed, static variables.

5. The method according to claim 1, wherein the reference marks include position information regarding a position of the combine harvester during measurements by the control pan and grain-loss sensor.

6. The method according to claim 5, wherein the position information of the reference marks, which are assigned to the sensor grain-loss values, are generated during the harvesting operation by an electronic positioning system of the combine harvester and correspond to a position of the combine harvester during a measurement of the sensor grain-loss values.

7. The method according to claim 5, wherein the calibration data are designed for a position-dependent calibration of the grain-loss sensor, and wherein the calibration data for a particular position are determined from a reconciliation of a sensor grain-loss value and a grain-loss quantity for a reference mark corresponding to the particular position.

8. The method according to claim 1, wherein the reference marks include a particular piece of time information related to the measurement time, and wherein reconciliation of the grain-loss quantities with the sensor grain-loss values according to the reference marks takes into account a process-time offset between the measurement of the sensor grain-loss values and the leaving-behind of the grain-loss quantities.

9. The method according to claim 1, wherein the grain-loss quantities are provided as a number of grains per area, as a volume of grains per area, or as grain mass per area.

10. The method according to claim 1, wherein the reference marks assigned thereto are wirelessly transmitted to the central computer during measurement of the sensor grain-loss values.

11. The method according to claim 1, wherein the measurement of the grain-loss quantities is initiated by the combine harvester and wherein the combine harvester assigns a particular reference mark to the measured grain-loss quantities.

12. The method according to claim 11, wherein the measurement of the grain-loss quantities is initiated by a measuring system, which is separate from the combine harvester and wherein the measuring system assigns the particular reference mark to the measured grain-loss quantities.

13. The method according to claim 1, wherein the control pan is disposed on the combine harvester and the measurement of grain loss quantities takes place by the combine harvester depositing the control pan on the ground, and wherein the combine harvester then travels over the control pan until the control pan is disposed under a separating assembly of the combine harvester where the control pan receives the grain loss quantities from the separating assembly, and grain deposited in the control pan is measured to obtain the grain loss quantities.

14. The method according to claim 1, wherein the control pan, for receiving the grain-loss quantities, is placed manually independently of the combine harvester.

15. The method according to claim 1, wherein the determined calibration data are stored and are transmitted wirelessly to a further combine harvester, from the central computer.

* * * * *